United States Patent
Yang et al.

(10) Patent No.: US 8,468,013 B2
(45) Date of Patent: Jun. 18, 2013

(54) METHOD, SYSTEM AND COMPUTER READABLE RECORDING MEDIUM FOR CORRECTING OCR RESULT

(75) Inventors: Byoung Seok Yang, Anyang-si (KR); Hee Cheol Seo, Daejeon (KR); Do Gil Lee, Seoul (KR); Ki Joon Sung, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 841 days.

(21) Appl. No.: 12/650,062

(22) Filed: Dec. 30, 2009

(65) Prior Publication Data
US 2010/0169077 A1    Jul. 1, 2010

(30) Foreign Application Priority Data
Dec. 30, 2008 (KR) .......................... 10-2008-0137528

(51) Int. Cl.
*G06F 17/27* (2006.01)
(52) U.S. Cl.
USPC ................ 704/9; 704/251; 704/255; 704/257
(58) Field of Classification Search
USPC ............... 704/1–10, 270, 272, 251, 255, 257, 704/270.1; 382/275
See application file for complete search history.

(56) References Cited

U.S. PATENT DOCUMENTS
6,965,703 B1 * 11/2005 Regev .......................... 382/275

FOREIGN PATENT DOCUMENTS
KR   2008-0104517   12/2008

OTHER PUBLICATIONS

Jaehui Park et al., "Metadata Formatting Scheme on Data in Wiki-System for Reusability", Proceedings of Korea Computer Congress vol. 34, No. 1(c), 2007, pp. 49-52, with English Abstract.

* cited by examiner

*Primary Examiner* — Huyen X. Vo
(74) *Attorney, Agent, or Firm* — H.C. Park & Associates, PLC

(57) ABSTRACT

Disclosed is a method, system and computer readable recording medium for correcting an OCR result. According to an exemplary embodiment of the present invention, there is provided a method for correcting an OCR result, the method including performing character recognition on content including character information using an OCR technique, removing extra carriage return information from the content, outputting the character recognition result, and correcting word spacing on the outputted result.

21 Claims, 3 Drawing Sheets

Fig. 4a

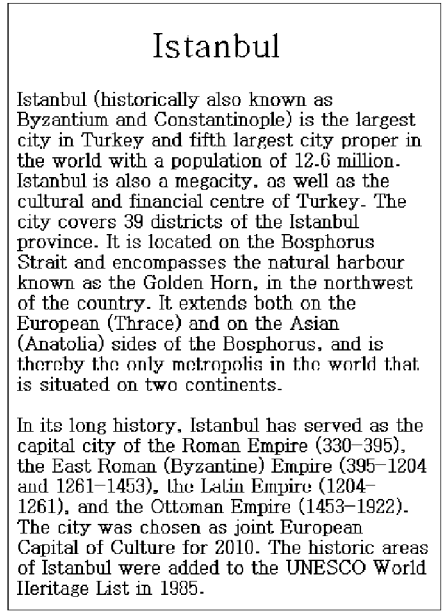

Istanbul

Istanbul (historically also known as Byzantium and Constantinople) is the largest city in Turkey and fifth largest city proper in the world with a population of 12.6 million. Istanbul is also a megacity, as well as the cultural and financial centre of Turkey. The city covers 39 districts of the Istanbul province. It is located on the Bosphorus Strait and encompasses the natural harbour known as the Golden Horn, in the northwest of the country. It extends both on the European (Thrace) and on the Asian (Anatolia) sides of the Bosphorus, and is thereby the only metropolis in the world that is situated on two continents.

In its long history, Istanbul has served as the capital city of the Roman Empire (330–395), the East Roman (Byzantine) Empire (395–1204 and 1261–1453), the Latin Empire (1204–1261), and the Ottoman Empire (1453–1922). The city was chosen as joint European Capital of Culture for 2010. The historic areas of Istanbul were added to the UNESCO World Heritage List in 1985.

Fig.4b

Istanbul

Istanbul (historically also known as Byzantium and Constantinople) is the largest city in Turkey and fifth largest city proper in the world with a population of 12.6 million. Istanbul is also a megacity, as well as the cultural and financial centre of Turkey. The city covers 39 districts of the Istanbul province. It is located on the Bosphorus Strait and encompasses the natural harbour known as the Golden Horn, in the northwest of the country. It extends both on the European (Thrace) and on the Asian (Anatolia) sides of the Bosphorus, and is thereby the only metropolis in the world that is situated on two continents.

In its long history, Istanbul has served as the capital city of the Roman Empire (330–395), the East Roman (Byzantine) Empire (395–1204 and 1261–1453), the Latin Empire (1204–1261), and the Ottoman Empire (1453–1922). The city was chosen as joint European Capital of Culture for 2010. The historic areas of Istanbul were added to the UNESCO World Heritage List in 1985.

Fig. 5 province. It is located on the Bosphorus
Strait and encompasses the natural harbour

METHOD, SYSTEM AND COMPUTER READABLE RECORDING MEDIUM FOR CORRECTING OCR RESULT

CROSS REFERENCE TO RELATED APPLICATION

This application claims priority from and the benefit of Korean Patent Application No. 10-2008-0137528, filed on Dec. 30, 2008, which is hereby incorporated by reference for all purposes as if fully set forth herein.

BACKGROUND OF THE INVENTION

1. Field of the Invention

Exemplary embodiments of the present invention relate to a method, system and computer readable recording medium for correcting an optical character recognition (OCR) result, and more specifically, to a method, system and computer readable recording medium, in which the OCR result is provided after removing all carriage returns except the carriage returns indicating the start or an end of a paragraph, and correcting word spacing using the Hidden Markov Model (HMM) or the like in providing a character recognition result, thereby providing the character recognition result, in which grammatically correct word spacing is reflected, without having unnecessary carriage returns.

2. Discussion of the Background

As the Internet is widely used and various types of information are distributed through information communication networks, people increasingly depend on the Internet, which functions as an information acquiring means.

Particularly, efforts for recognizing character information included in information that exists in the form of an image or a moving image and converting the character information into mechanically readable information are made so that Internet users may use the character information more easily. For example, various character recognition techniques for analyzing characters in an image and converting the characters into mechanically readable text information have been developed and used. Among the techniques, an optical character recognition (OCR) technique is widely used.

FIG. 1a is a view showing an example of an image of an optical character recognition target, and FIG. 1b is a view showing a result of performing character recognition on the image of FIG. 1a according to a conventional optical character recognition technique.

As described above, in conventional optical character recognition, a result as shown in FIG. 1b is outputted by analyzing an area including characters from the image shown in FIG. 1a and recognizing mechanically readable characters from the area. Editable or modifiable text information may be obtained using such a character recognition technique.

However, according to the conventional optical character recognition technique, as shown in FIG. 1a and FIG. 1b, character information shown in different lines in the original image information may be presented in different lines in a character recognition result corresponding to the original image information. That is, although a sentence or paragraph is not complete in the original image information, it may be split in different lines depending on the size of the area including the character information. In the conventional optical character recognition technique, all of the split lines are recognized as being applied with a carriage return, and a result of applying "Enter" characters between the lines is outputted. Accordingly, if a sentence or paragraph is split into many lines due to the narrow width of the original text as shown in FIG. 1a, although the character information of "Istanbul (historically also known as" and the character information of "Byzantium and Constantinople) is the largest" are included in one connected sentence having a length that can be expressed in one line of a general word processor document, as shown in the conventional recognition result of FIG. 1b, they are shown in different lines if they are copy-and-pasted into a word processor document or the like.

Furthermore, if the image information of a character recognition target includes a plurality of pages, although the last information of a previous page and the first information of a next page may be information included in one sentence or paragraph, a carriage return may be recognized between the two pieces of information, and they may be outputted in different lines in a character recognition result.

When a user edits or modifies such a character recognition result using a word processor or the like, the user may find it necessary to delete a large amount of "Enter" characters (i.e., carriage returns) from the conventional recognition result.

Another problem is that conventional OCR techniques may output improper word spacing included in a character recognition result, and thus it may be beneficial to develop a technique for outputting a character recognition result where unnecessary carriage returns are removed and correct word spacing is reflected.

SUMMARY OF THE INVENTION

Exemplary embodiments of the present invention provide a solution to the aforementioned problems.

Exemplary embodiments of present invention also provide a character recognition result that does not contain unnecessary carriage returns by recognizing unnecessary carriage returns (those other than the carriage returns inserted with respect to a start or an end of a paragraph) and collectively removing the unnecessary carriage returns in providing the character recognition result.

Exemplary embodiments of present invention also provide character information, in which grammatically correct word spacing is reflected, as a character recognition result by correcting word spacing included in the character recognition result using the Hidden Markov Model (HMM).

Exemplary embodiments of present invention also provide a correct search result by utilizing a character recognition result, in which unnecessary carriage returns are removed and correct word spacing is reflected, for Internet search services.

Additional features of the invention will be set forth in the description which follows, and in part will be apparent from the description, or may be learned by practice of the invention.

An exemplary embodiment of the present invention discloses a method for correcting an optical character recognition (OCR) result, the method including performing character recognition on a content using an OCR technique, the content including character information, removing extra carriage return information from the result of performing character recognition, wherein the extra carriage return information includes carriage return information other than carriage return information indicating a start of a paragraph or an end of a paragraph, outputting a character recognition result after removing the extra carriage return information, and correcting word spacing on the outputted character recognition result.

An exemplary embodiment of the present invention also discloses a system for correcting an optical character recognition (OCR) result, the system including a character recognition unit to perform character recognition on a content using an OCR technique, the content including character information, to remove extra carriage return information from the result of performing character recognition, wherein the extra carriage return information includes carriage return information other than carriage return information indicating a start of a paragraph or an end of a paragraph, and to output a character recognition result after removing the extra carriage return information, and a language model unit to receive the outputted character recognition result and to correct word spacing on the outputted character recognition result.

An exemplary embodiment of the present invention also discloses A non-transitory computer-readable recording medium including an executable program which, when executed, performs the steps of performing character recognition on content using an OCR technique, wherein the content includes character information, removing extra carriage return information from the content, wherein the extra carriage return information includes carriage return information other than carriage return information indicating the start of a paragraph or the end of a paragraph, outputting a character recognition result in response to the removal of the extra carriage return information, and correcting word spacing on the outputted character recognition result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 1b is a view showing a result of applying a conventional optical character recognition technique to the image information of FIG. 1a.

FIG. 4a is a view showing an example of image information of a character recognition target according to an exemplary embodiment of the present invention.

FIG. 4b is a view showing a result of applying a character recognition technique according to an exemplary embodiment of the present invention to the image information of FIG. 4a.

FIG. 5 is a view showing an example of image information including characters recognized and utilized for an Internet search service.

DETAILED DESCRIPTION OF THE ILLUSTRATED EMBODIMENTS

Figure 1A:
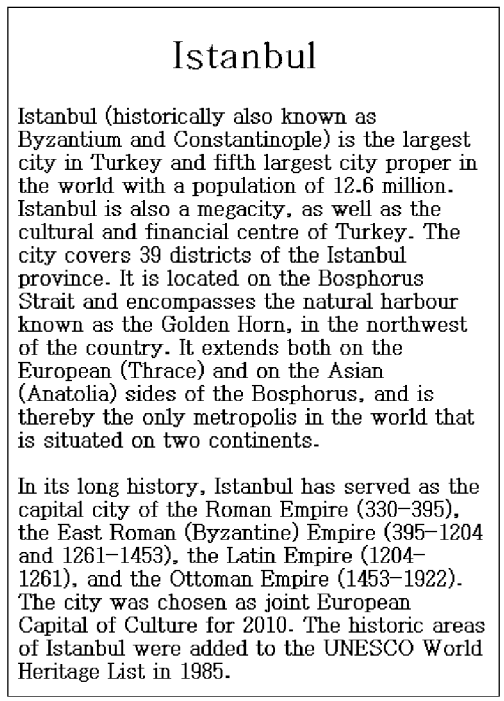
FIG. 1a is a view showing an example of image information of a character recognition target according to a conventional technique.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It is to be understood that the various exemplary embodiments of the invention, although different from each other, are not necessarily mutually exclusive. For example, specific configurations, structures, and features described herein, in connection with one exemplary embodiment, may be implemented within other embodiments without departing from the spirit and scope of the invention. In addition, it is to be understood that the location or arrangement of individual elements within each disclosed exemplary embodiment may be modified without departing from the spirit and scope of the invention. The following detailed description is, therefore, not to be taken for the purpose of limitation, and the scope of the present invention is defined only by the appended claims, appropriately interpreted, along with the full range of equivalents to which the claims are entitled.

"Character recognition" is a process of recognizing and analyzing characters included in an image or the like and extracting mechanically readable characters, and should be understood as a general term including character recognition techniques such as optical character recognition (OCR) and the like.

Configuration of the System

Figure 2:
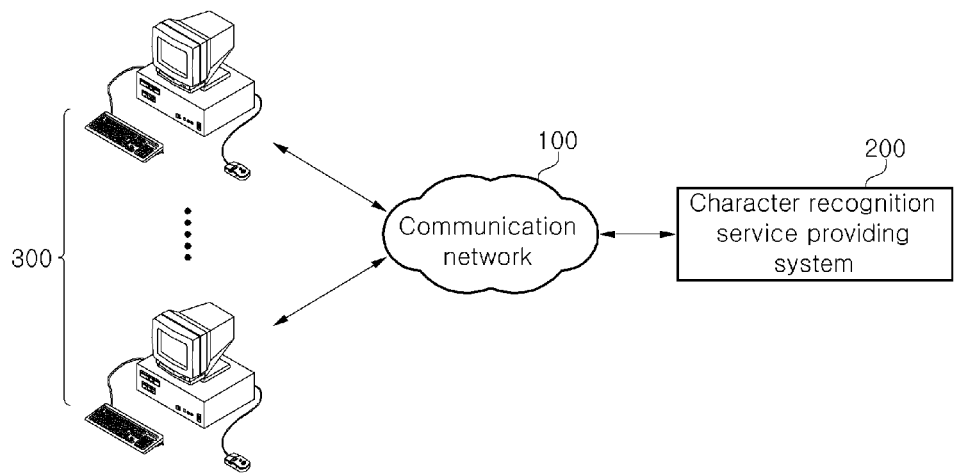
FIG. 2 is a view showing a schematic configuration of a system for providing a character recognition result wherein unnecessary carriage returns are removed and grammatically correct word spacing is reflected according to an exemplary embodiment of the present invention.

FIG. 2 is a view showing a schematic configuration of a system for providing a character recognition result wherein unnecessary carriage returns are removed and grammatically correct word spacing is reflected according to an exemplary embodiment of the present invention.

As shown in FIG. 2, the system of an exemplary embodiment of the present invention includes a communication network 100, a character recognition service providing system 200 to provide character recognition service, and a user terminal device 300 capable of connecting to the character recognition service providing system 200 through the communication network 100.

First, the communication network 100 may be configured regardless of the type of communication involved (e.g., wired or wireless communication) and may be constructed as a variety of communication networks such as, for example, a local area network (LAN), a metropolitan area network (MAN), a wide area network (WAN), and the like. The communication network 100 referred to may be a well-known network such as the world wide web (WWW).

The character recognition service providing system 200 according to an exemplary embodiment of the present performs character recognition on a character recognition target (e.g., an image or the like including character information).

The characters included in the contents of a character recognition target may form a plurality of lines depending on the width of a page. In this case, the character recognition service providing system 200 may concatenate the lines, other than the lines where certain exceptions described later are applied, and may transfer the concatenated lines to a language model to recognize the characters, thereby preventing the characters from being recognized with unnecessary carriage returns.

In addition, even when the character recognition service providing system 200 according to an exemplary embodiment of the present invention receives contents including a plurality of pages as a character recognition target, the character recognition service providing system 200 may concatenate the last character information of a page and the first character information of the next page, other than where certain exceptions described later are applied, and may transfer them to the language model.

A conventional character recognition service may unconditionally insert a carriage return between character information presented in different lines shown in a character recognition target and may provide a result of the character recognition. Accordingly, when the character recognition result is copy-and-pasted into a word processor document or the like, the recognized contents may not fit to the page width of the word processor document, but may be inserted into the word processor document as shown in the character recognition target, where the carriage returns are applied.

The character recognition service providing system 200 of an exemplary embodiment of the present invention may concatenate character information in neighboring lines of the character recognition target and may transfer the concatenated character information to the language model, except in cases where certain exceptions described later are applied, in order to prevent including excess carriage returns.

In addition, the character recognition service providing system 200 according to an exemplary embodiment of the present invention may perform word spacing correction on the data transferred to the language model, where word spacing is ignored, and may output character information in which correct word spacing is reflected. Here, the character recognition service providing system 200 places a flag for determining word spacing to each character, performs word spacing using the language model based on the flag, and outputs corrected character information.

The user terminal device 300 according to an exemplary embodiment of the present invention may be a digital device that may include a function for allowing a user to connect to and communicate with the character recognition service providing system 200. Any digital device including a memory means and a microprocessor and having an operation capability, such as a personal computer (e.g., a desktop computer, a notebook computer, or the like), a workstation, a PDA, a web pad, a cellular phone, or the like, can be adopted as the user terminal device 300 according to an exemplary embodiment of the present invention without restriction. In addition, the user terminal device 300 may further include a web browser (not shown) program for allowing the user to receive services from the character recognition service providing system 200.

Configuration of Character Recognition Service Providing System

Hereinafter, the configuration of the character recognition service providing system 200, which performs important functions for implementing an exemplary embodiment of the present invention, will be described together with the functionality of each component.

Figure 3:
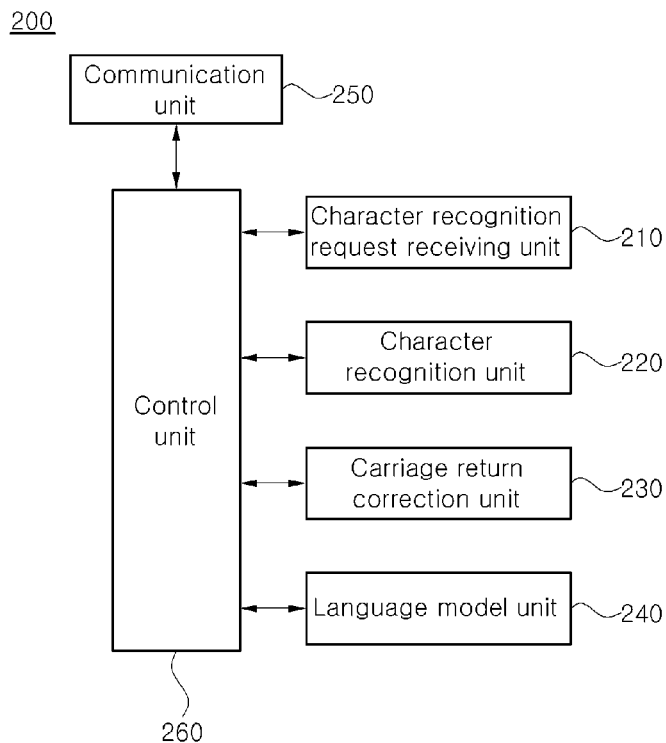
FIG. 3 is a view showing an internal configuration of a character recognition service providing system according to an exemplary embodiment of the present invention.

FIG. 3 is a view showing a configuration of the character recognition service providing system 200 according to an exemplary embodiment of the present invention. Referring to FIG. 3, the character recognition service providing system 200 according to an exemplary embodiment of the present invention includes a character recognition request receiving unit 210, a character recognition unit 220, a carriage return correction unit 230, a language model unit 240, a communication unit 250, and a control unit 260. According to an exemplary embodiment of the present invention, at least one of the character recognition request receiving unit 210, the character recognition unit 220, the carriage return correction unit 230, the language model unit 240, the communication unit 250, and the control unit 260 may be a program module communicating with the user terminal device 300. Such a program module may be included in the character recognition service providing system 200 in the form of an operating system, an application program module, or other program modules, and may be physically stored in a variety of commonly known memory devices. In addition, such program modules may be stored in a remote memory device capable of communicating with the character recognition service providing system 200. Although such program modules may include routines, subroutines, programs, objects, components, data structures, or the like for performing a task (described later) or for executing a specific abstract data type, they are not limited thereto.

The character recognition request receiving unit 210 according to an exemplary embodiment of the present invention may receive a request for recognizing characters, which are included in contents of a character recognition target, from the user terminal device 300, together with information on the contents. The user may request character recognition by transmitting the contents of a character recognition target or by transmitting an identifier of corresponding contents.

The character recognition unit 220 according to an exemplary embodiment of the present invention may recognize characters in response to the request received from the character recognition request receiving unit 210.

The character recognition unit 220 may recognize an image containing contents that will be a recognition target and may analyze the parts within the recognized image that include characters by using a commonly known analysis algorithm. In relation to this, those skilled in the art may refer to character recognition techniques disclosed in a publicized technical document titled "Proceedings of Korea Computer Congress Vol. 34, No. 1(c)" of the Korean Institute of Information Scientists and Engineers, commonly known optical character recognition (OCR) techniques, and the like.

The character recognition unit 220 may extract real characters determined to correspond to characters expressed in an image form. In this process, a similarity between the analyzed image-form characters and the real characters is calculated, and real characters having the highest similarity may be extracted. The character recognition unit 220 extracts mechanically readable characters from the character information included in the character recognition target through such a process.

The carriage return correction unit 230 according to an exemplary embodiment of the present invention may correct carriage returns included in the character information extracted by the character recognition unit 220. As described above, if character information is presented in different lines in the contents of character recognition target, the character recognition unit 220 may have recognized the character information to include as many carriage returns. Accordingly, the character information outputted from the character recognition unit 220 may include unnecessary carriage returns. The carriage return correction unit 230 may remove the unnecessary carriage returns by performing an operation to be described below.

The carriage return correction unit 230 may remove carriage returns from a result outputted by the character recognition unit 220. That is, although the character information may be presented in different lines, character information in neighboring lines may be concatenated. However, if exceptions described below are satisfied, the neighboring lines may not be concatenated.

First, if an indentation is applied to a line, it may be assumed as the start of a new line, and the line may be transferred to the language model without being concatenated with the previous line. That is, if there is an indentation in a line, it may be analyzed as the start of a new paragraph, and the character information may be presented in a line different from the previous line. Here, although the indentation width may be defined as a space that is 0.5 times as wide as the height of the previous line, it is not limited thereto.

In addition, if the character information included in the previous line ends before arriving at the right margin of a page, the character information may be transferred to the language model without concatenating the new line and the previous line. That is, if the character information ends before arriving at the right end of a page (if there is a margin at the right side of a page, the left end of the corresponding margin), it means that the paragraph may end at the corresponding line, and therefore, the next new line may not be presented in concatenation with the previous line.

The carriage return correction unit 230 may insert carriage return information, i.e., an "Enter" character, only in the two exceptional cases described above, and may output the character information. All the neighboring lines may be concatenated with each other in all cases but the two exceptional cases described above. In this manner, a carriage return may be inserted in the character information outputted as a character recognition result only when a paragraph starts or ends. Accordingly, unnecessary carriage returns may be removed.

Although an exemplary embodiment of the present invention has been described assuming that the character recognition unit 220 is separately configured from the carriage return correction unit 230, the present invention is not necessarily limited thereto. For example, in an alternate exemplary embodiment, the character recognition unit 220 and the carriage return correction unit 230 may be integrated.

In the meantime, the language model unit 240 according to an exemplary embodiment of the present invention may automatically correct word spacing included in the data (i.e., data in which word spacing is ignored) received from the carriage return correction unit 230. The word spacing correction may be automatically performed by the language model unit 240 using the Hidden Markov Model (HMM) or the like. The HMM is described in detail in Korea Patent Application No. 2008-0104517, published on Dec. 3, 2008, which is hereby incorporated by reference for all purposes as if fully set forth herein, and which will be only briefly described below.

The language model unit 240 may receive character information in which word spacing is ignored as described above and may configure character information to reflect correct word spacing based on the received character information. The correction process will be briefly described. The character information received from the carriage return correction unit 230 may include a syllable sequence C and a word spacing tag sequence U that may define word spacing, and the language model unit 240 may use the HMM to determine an optimum word spacing tag sequence U that maximizes the probability of combining the syllable sequence C and the tag sequence U. To accomplish this, the Viterbi algorithm may be used. Thereafter, the language model unit 240 may apply the optimum word spacing tag sequence U to the character information from which the word spacing is removed and may output character information in which grammatically correct word spacing is reflected. Accordingly, the user may obtain character information in which correct carriage returns and grammatically correct word spacing are reflected as a character recognition result.

The communication unit 250 according to an exemplary embodiment of the present invention may receive a character recognition request from the user terminal device 300 and may transmit a result of character recognition to the user terminal device 300. On the whole, the communication unit 250 may transmit and receive data to and from the character recognition service providing system 200.

The control unit 260 according to an exemplary embodiment of the present invention may control data flow among the character recognition request receiving unit 210, the character recognition unit 220, the carriage return correction unit 230, the language model unit 240, and the communication unit 250. That is, the control unit 260 according to an exemplary embodiment of the present invention may control the character recognition request receiving unit 210, the character recognition unit 220, the carriage return correction unit 230, the language model unit 240, and the communication unit 250 to perform functions by controlling data flowing from outside or among the components of the character recognition service providing system 200.

An Example of Correcting an OCR Result

FIG. 4a is a view showing an image file of a character recognition target. FIG. 4b is a view showing a result of character recognition performed on the image file of FIG. 4a. Although an English text is selected and described in FIG. 4a, FIG. 4b, and FIG. 5, this is merely an exemplary embodiment, and the present invention is applicable to any other language, in addition to English.

As described above, the character recognition service providing system 200 of an exemplary embodiment of the present invention may correct word spacing using the HMM in the state where carriage returns have been removed and may output character information.

Figure 1B:
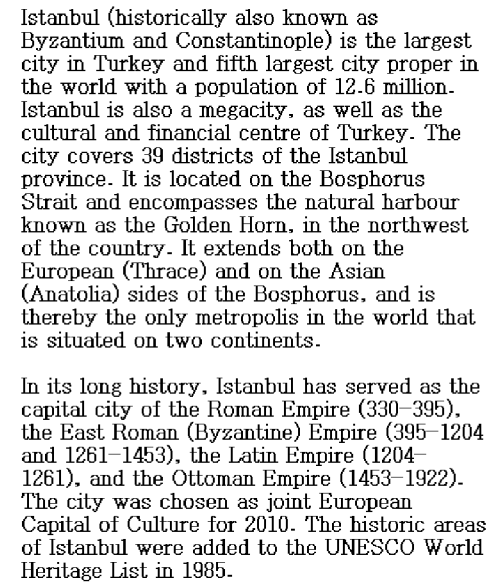

Accordingly, if the character recognition according to an exemplary embodiment of the present invention is applied to the image file of FIG. 4a, a text result in which an "Enter" character is inserted only when a new paragraph starts is outputted as shown in FIG. 4b. Comparing a result of FIG. 4b with a conventional character recognition result as shown in FIG. 1b, it can be understood that a carriage return is inserted only when paragraphs are divided, and that word spacing is corrected.

Therefore, according to the character recognition technique of an exemplary embodiment of the present invention, when a result of character recognition is copy-and-pasted into a word processor document or the like, a user is not inconvenienced by the need to remove unnecessary carriage returns and to correct word spacing.

When a result of character recognition according to an exemplary embodiment of the present invention is used for searching, a correct search result can be obtained. This will be described with reference to FIG. 5.

As shown in FIG. 5, when character recognition is performed on an image file including characters, and when the character recognition is used for a search service, conventionally, since it may be determined that there is no word spacing where a line is changed to a new line, the information shown in FIG. 5 may be outputted as a search result only when the text is searched by inputting a search keyword of "BosphorusStrait". However, if the text is searched by inputting a search keyword of "Bosphorus Strait," where correct word spacing is reflected, the information shown in FIG. 5 may not be outputted as a search result.

According to the character recognition technique of an exemplary embodiment of the present invention, since a result in which grammatically correct word spacing is reflected may be outputted as a recognition result, although character information may be included in a character recognition target in any form, character recognition in which correct word spacing is reflected can be performed on the image file of FIG. 5, and the information shown in FIG. 5 may be outputted as a search result when a search is performed using a search keyword of "Bosphorus Strait".

Here, an OCR result where carriage returns and word spacing are corrected as shown in FIG. 5 may be used for Internet search services by a search service providing unit (not shown).

The aforementioned exemplary embodiments of the present invention can be implemented in the form of a program command that can be executed through a variety of components of a computer and recorded in a computer readable medium. The computer readable medium may store program commands, data files, data structures, and the like in an independent or combined form. The program command recorded in the computer readable medium may be a command specially designed and constructed for an exemplary embodiment the present invention or a command publicized to and used by those skilled in a computer software field. The computer readable medium includes, for example, magnetic media such as a hard disk, a floppy disk and a magnetic tape, optical recording media such as CD-ROM and DVD, magneto-optical media such as a floptical disk, and a hardware device specially constructed to store and execute a program command, such as ROM, RAM, flash memory, and the like. The program command may include, for example, high-level language codes that can be executed by a computer using an interpreter or the like, as well as machine language codes created by a compiler. The hardware device may be constructed to operate as one or more software modules in order to perform the processing according to the present invention, and vice versa.

As described above, according to an exemplary embodiment of the present invention, in providing a character recognition result, a result in which a carriage return is inserted only at a starting or ending point of a paragraph is outputted, and a user is relieved from the inconvenience of editing the character recognition result by deleting "Enter" characters corresponding to carriage returns one by one when the user updates or edits the character recognition result using a word processor or the like.

Furthermore, according to an exemplary embodiment of the present invention, if data where word spacing is ignored is inputted into the language model, grammatically correct word spacing is reflected through the language model, and the data can be provided as a character recognition result.

According to an exemplary embodiment of the present invention, a character recognition result where unnecessary carriage returns may be removed and grammatically correct word spacing may be reflected may be used for Internet search services, and thus, a correct search result can be provided in response to a search keyword input.

As described above, although the present invention has been described with reference to limited exemplary embodiments and accompanying drawings and specific matters such as components, these are provided only for the purpose of understanding the present invention, and the present invention is not limited to the exemplary embodiments.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor to correct an optical character recognition (OCR) result, the method comprising:
performing character recognition on a content using an OCR technique, the content comprising character information;
removing, using the processor, extra carriage return information from the result of performing character recognition, wherein the extra carriage return information comprises carriage return information other than carriage return information indicating a start of a paragraph or an end of a paragraph;
outputting a character recognition result after removing the extra carriage return information; and
correcting word spacing on the outputted character recognition result.

2. The method of claim 1, wherein the carriage return information comprises an "Enter" character.

3. The method of claim 1, wherein performing character recognition comprises:
analyzing the character information; and
extracting at least one character corresponding to the character information.

4. The method of claim 1, further comprising:
recognizing an indentation in the result of character recognition, and a carriage return preceding the indentation,
wherein the carriage return information indicating the start of the paragraph or the end of the paragraph comprises information corresponding to the carriage return preceding the indentation.

5. The method of claim 4, wherein recognizing the indentation comprises recognizing a space 0.5 times larger than a height of a previous line at a starting point of a line.

6. The method of claim 1, further comprising:
recognizing, in a character recognition result, a carriage return that follows a first line, wherein the first line ends without reaching a right side of the content,
wherein the carriage return information indicating the start or the end of the paragraph comprises information corresponding to the carriage return that follows the first line.

7. The method of claim 6, wherein the right side of the content comprises a left side of a right margin disposed in the content.

8. The method of claim 1, wherein correcting word spacing comprises:
associating a flag for determining word spacing with each character comprising the outputted character recognition result; and
correcting the word spacing by determining whether to perform the word spacing for each character based on the flag.

9. The method of claim 1, wherein correcting word spacing is performed using a Hidden Markov Model (HMM).

10. The method of claim 1, further comprising:
outputting a corrected OCR result based on the corrected word spacing and outputted character recognition result; and
using the corrected OCR result for Internet search services.

11. A system for correcting an optical character recognition (OCR) result, the system comprising:
a processor; and
one or more non-transitory computer-readable recording media comprising instructions executable by the processor, the one or more non-transitory computer-readable recording media comprising:
a character recognition unit to perform character recognition on a content using an OCR technique, the content comprising character information, to remove extra carriage return information from the result of performing character recognition, the extra carriage return information comprising carriage return information other than carriage return information indicating a start of a paragraph or an end of a paragraph, and to output a character recognition result after removal of the extra carriage return information; and a language model unit to receive the outputted character recognition result and to correct word spacing on the outputted character recognition result.

12. The system of claim 11, wherein the carriage return information comprises an "Enter" character.

13. The system of claim 11, wherein the character recognition unit is configured to analyze the character information and to extract at least one character corresponding to the character information.

14. The system of claim 11, wherein the character recognition unit is configured to recognize an indentation in the result of character recognition, and to recognize a carriage return preceding the indentation, and wherein the carriage return information indicating the start of the paragraph or the end of the paragraph comprises information corresponding to the carriage return preceding the indentation.

15. The system of claim 14, wherein recognizing the indentation comprises recognizing a space 0.5 times larger than a height of a previous line at a starting point of a line.

16. The system of claim 11, wherein the character recognition unit is configured to recognize, in a character recognition result, a carriage return that follows a first line, wherein the first line ends without reaching a right side of the content, and wherein the carriage return information indicating the start or the end of the paragraph comprises information corresponding to the carriage return that follows the first line.

17. The system of claim 16, wherein the right side of the content comprises a left side of a right margin disposed in the content.

18. The system of claim 11, wherein the language model unit is configured to associate a flag for determining word spacing with each character comprising in the outputted character recognition result, and to correct the word spacing by determining whether to perform the word spacing for each character based on the flag.

19. The system of claim 11, wherein the language model unit is configured to correct word spacing using a Hidden Markov Model (HMM).

20. The system of claim 11, wherein the one or more non-transitory computer-readable recording media further comprise a search service providing unit, wherein the language model unit is configured to output a corrected OCR result based on the corrected word spacing and outputted character recognition result, and the search service providing unit is configured to use the corrected OCR result for Internet search services.

21. A non-transitory computer-readable recording medium comprising an executable program which, when executed, performs the steps of:

performing character recognition on a content using an OCR technique, the content comprising character information;

removing extra carriage return information from the result of character recognition, wherein the extra carriage return information comprises carriage return information other than carriage return information indicating a start of a paragraph or an end of a paragraph;

outputting a character recognition result after removing the extra carriage return information; and correcting word spacing on the outputted character recognition result.

* * * * *